US012449941B2

(12) United States Patent
Van Lier et al.

(10) Patent No.: US 12,449,941 B2
(45) Date of Patent: Oct. 21, 2025

(54) APPARATUS AND METHOD FOR CAPACITIVE TOUCH DETECTION

(71) Applicant: Touch Biometrix B.V., Weert (NL)

(72) Inventors: Wilhelmus Van Lier, St Asaph (GB); Henricus Derckx, St Asaph (GB)

(73) Assignee: Touch Biometrix B.V., Weert (NL)

( * ) Notice: Subject to any disclaimer, the term of this patent is extended or adjusted under 35 U.S.C. 154(b) by 0 days.

(21) Appl. No.: 18/572,957

(22) PCT Filed: Jun. 30, 2022

(86) PCT No.: PCT/GB2022/051691
§ 371 (c)(1),
(2) Date: Dec. 21, 2023

(87) PCT Pub. No.: WO2023/275559
PCT Pub. Date: Jan. 5, 2023

(65) Prior Publication Data
US 2024/0288972 A1    Aug. 29, 2024

(30) Foreign Application Priority Data

Jun. 30, 2021 (GB) .................................... 2109468

(51) Int. Cl.
*G06F 3/044* (2006.01)
*G01D 5/24* (2006.01)

(52) U.S. Cl.
CPC ............... *G06F 3/044* (2013.01); *G01D 5/24* (2013.01)

(58) Field of Classification Search
None
See application file for complete search history.

(56) References Cited

U.S. PATENT DOCUMENTS

| 2005/0226478 | A1* | 10/2005 | Fujiyoshi | G06V 40/1306 |
| | | | | 382/124 |
| 2015/0108986 | A1* | 4/2015 | Van Lier | G01R 27/2605 |
| | | | | 324/414 |
| 2016/0005363 | A1* | 1/2016 | Van Lier | G09G 3/3466 |
| | | | | 345/110 |

FOREIGN PATENT DOCUMENTS

| JP | 2017181252 | 10/2017 |
| WO | 2020178605 | 9/2020 |
| WO | 2021014162 | 1/2021 |

OTHER PUBLICATIONS

Combined Search & Examination Reposrt issued in GB109468.5 (May 3, 2022).

(Continued)

*Primary Examiner* — Stephen T. Reed
(74) *Attorney, Agent, or Firm* — Barnes & Thornburg LLP

(57) ABSTRACT

A method of operating a sensing element to sense a parameter, the sensing element comprising a sense TFT having a gate connection connected to a sensing electrode. the method comprising: providing a reference current ($I_{bias}$) through the sense TFT: providing a reference voltage ($V_{bias}$) at the gate connection to obtain a reference sample voltage ($V_{cap}$) from a source connection of the sense TFT: providing, at the gate connection, an indicator voltage ($V_{gate}$) dependent upon the parameter to be sensed whilst the reference current ($I_{bias}$) continues to be provided through the sense TFT to obtain a sensing voltage from the source connection of the sense TFT; and sensing the parameter based on the difference between the sensing voltage ($V_S$) and the reference sample voltage ($V_{cap}$).

20 Claims, 3 Drawing Sheets

(56) References Cited

OTHER PUBLICATIONS

Maddox H L, "High input impedance capacitance coupled voltage probes," Technical Digest, No. 45, p. 27-29, 1977 (Abstract).
Search Report & Written Opinion issued in PCT/GB2022/051691 (Oct. 27, 2022).

* cited by examiner

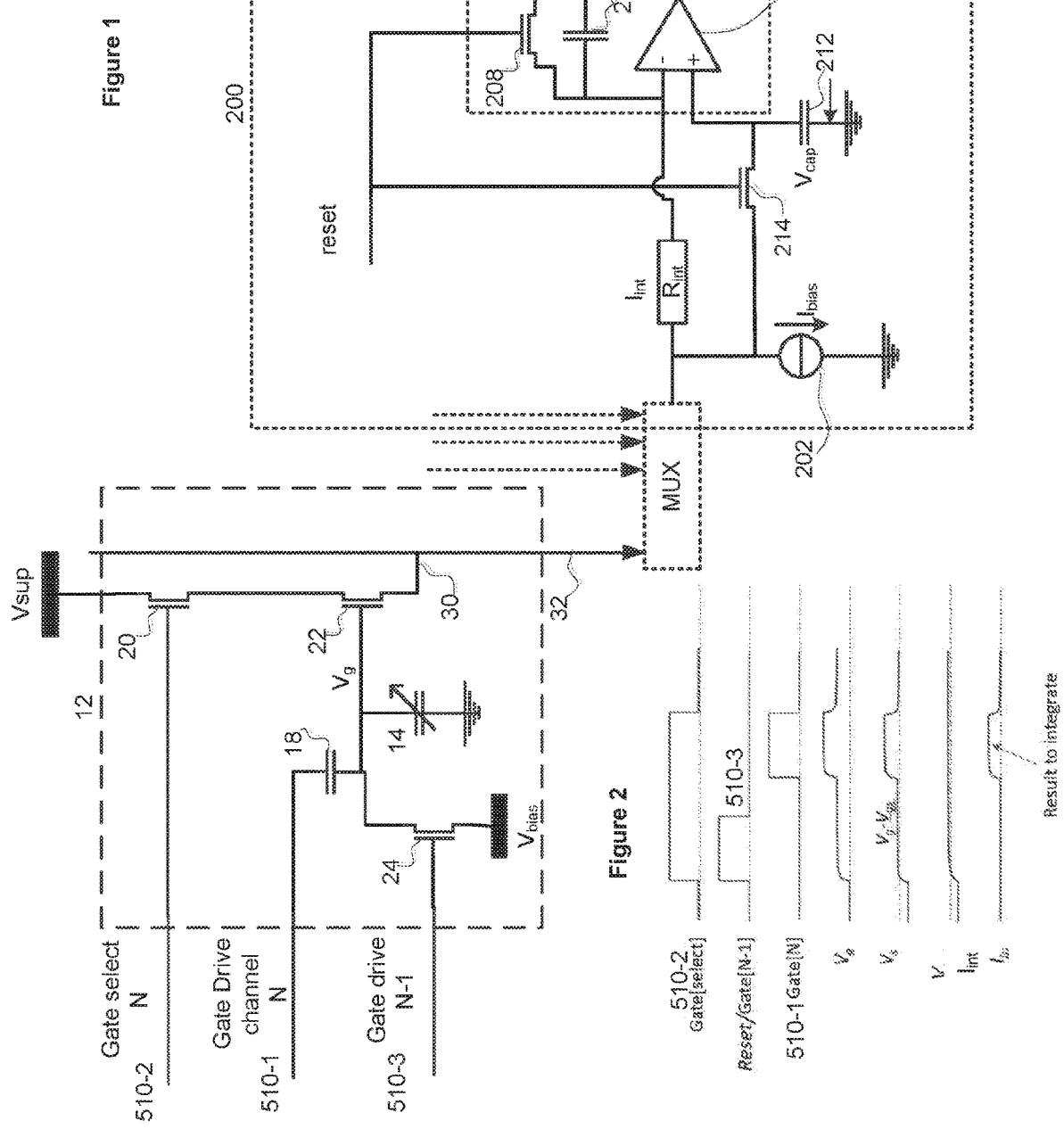

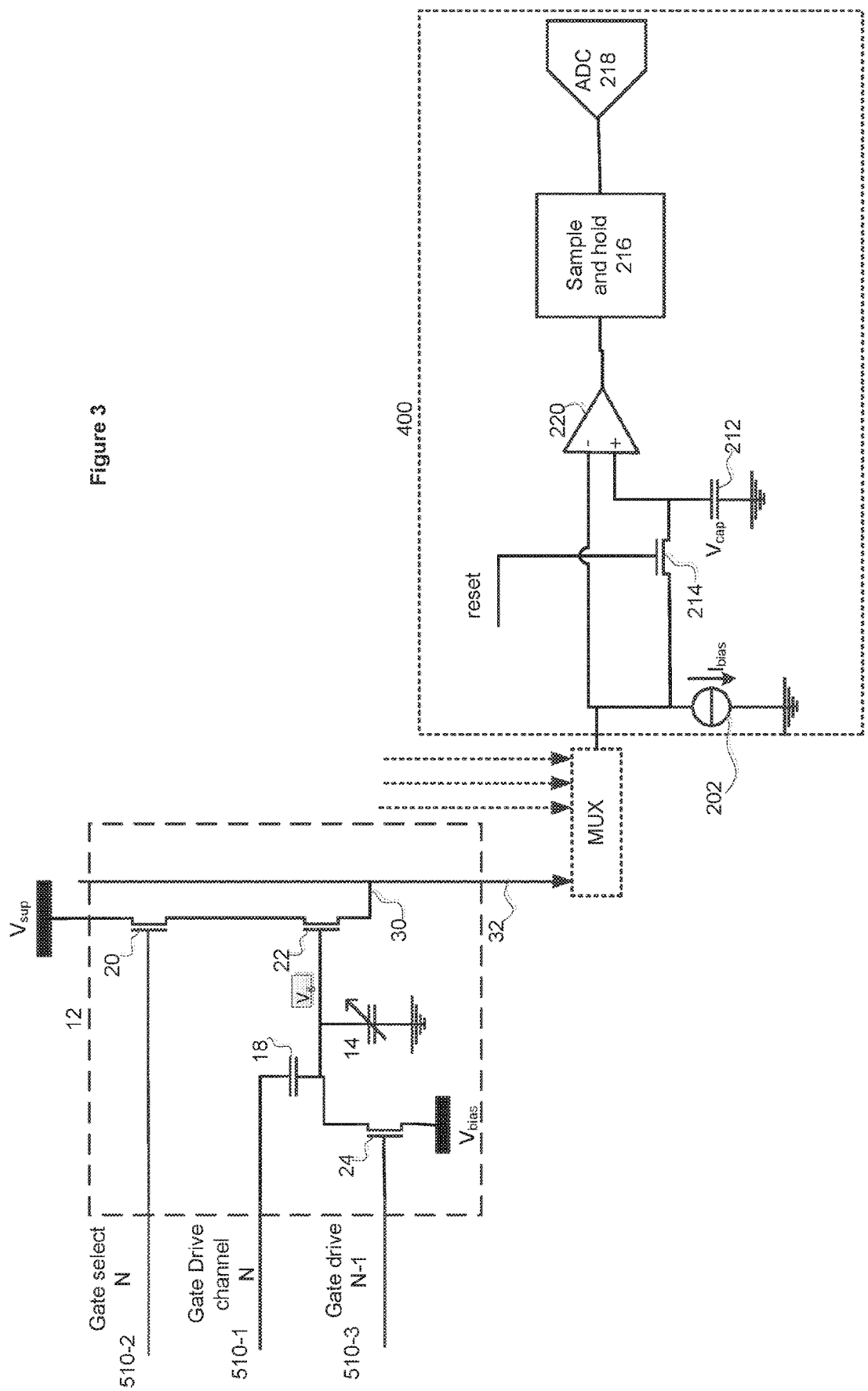

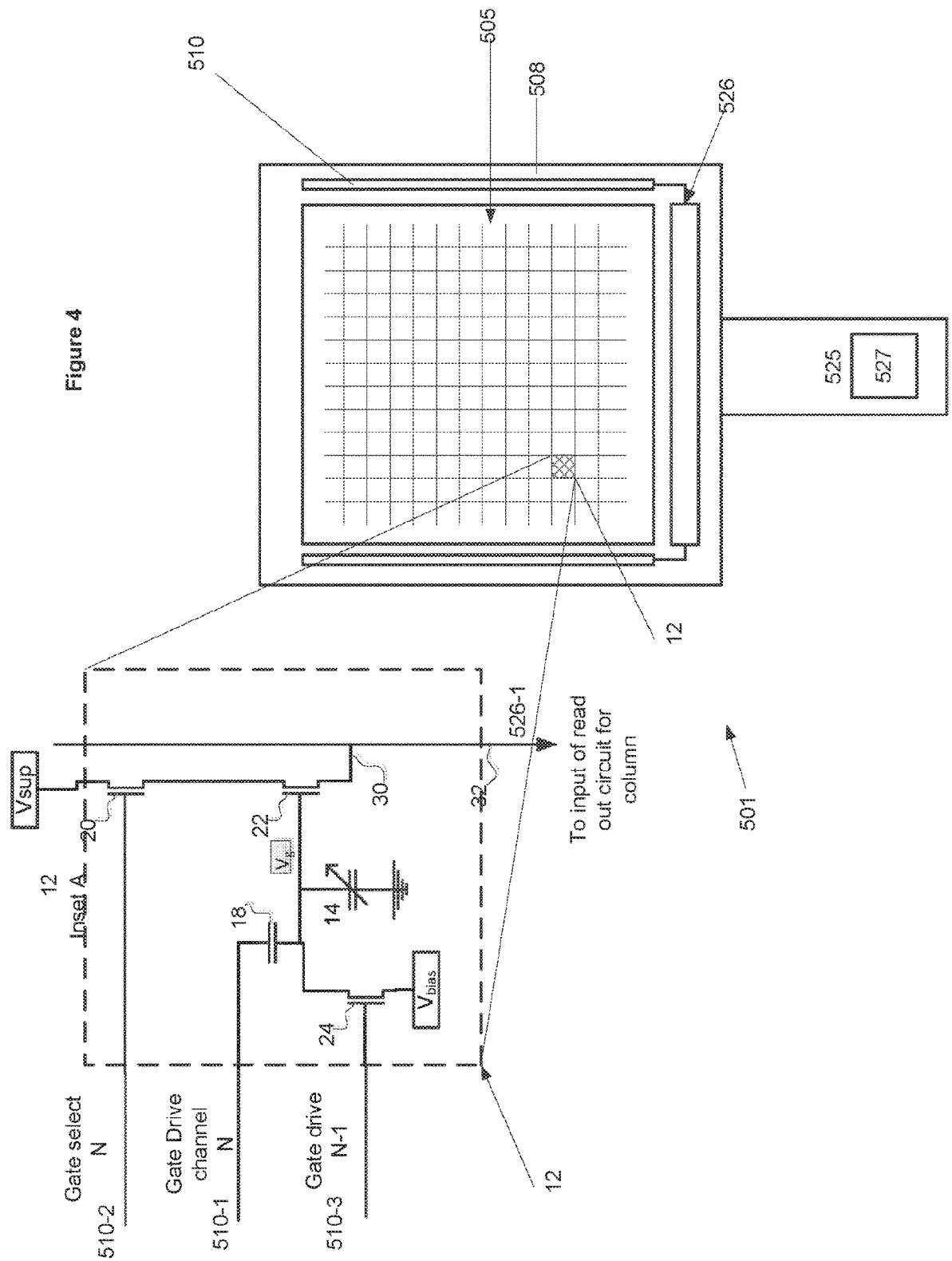

APPARATUS AND METHOD FOR CAPACITIVE TOUCH DETECTION

CROSS-REFERENCE TO RELATED APPLICATIONS

This application is a US national stage application under Section 371 of PCT Application No. PCT/GB2022/051691, filed on Jun. 30, 2022, which claims priority from United Kingdom Patent Application No. GB 2109468.5, filed on Jun. 30, 2021, the contents of which are each incorporated by reference herein in their entireties.

FIELD OF INVENTION

The present invention relates to apparatus and methods, and more particularly to touch sensitive surfaces, and methods of manufacturing such surfaces.

BACKGROUND

Sensing systems often comprise a large number of sensing elements, each of which senses the same parameter. For example, these sensing elements may be arranged in an array, each at a different location, so that the sensing elements can provide a spatial map of the parameter across the area of the array. The most commonplace example of such an arrangement is an array in the form of a rectilinear grid in which each cell of the grid, or pixel, is occupied by such a sensing element for sensing the parameter in that cell of the grid.

One useful application of arrays of sensors is the biometric measurement of skin contours, such as fingerprints and palmprints and so forth. Fingerprint sensing is of increasing commercial importance because secure, verifiable authentication, of user identity is an increasingly important part of all technology. To give just a few examples, it plays a part in:

user equipment (UE) used for communication and consumer access to media content,
  computer devices and systems which store and provide access to sensitive data,
  devices and systems used for financial transactions,
  access control for buildings,
  access control for vehicles, and
  personalised devices, such as keys, remote controllers, alarm systems, cameras, etc.

Biometric measurement of the user is now prevalent in all of these contexts and others.

Biometric measures such as iris scanning, and facial recognition are dependent on lighting and field of view of a camera. It may also be possible to circumvent such security measures by presenting a video or photo of the user, or a user body part, such as an iris or fingerprint to the camera.

Fingerprint sensors have been thought of as being more secure, but it is possible also to overcome the security they provide, and the manufacturing requirements of such sensors makes it difficult to integrate them into other electronic devices such as mobile telephones and other UEs. In particular, fingerprint sensing demands very high resolution— at least hundreds of pixels per inch.

One example of such a sensor is Apple Inc's Touch ID (RTM). This sensor is based on a laser-cut sapphire crystal. It uses a detection ring around the sensor to detect the presence of the user's finger. The Touch ID (RTM) sensor uses capacitive touch sensing to detect the fingerprint, and has a 500 pixel per inch (PPI) resolution.

Capacitance sensors such as these use capacitive effects associated with the surface contours of the fingerprint. The sensor array pixels each include an electrode which acts as one plate of a capacitor, the dermal layer (which is electrically conductive) acts as the other plate, and the non-conductive epidermal layer acts as a dielectric. The total dielectric may comprise the non-conductive epidermal layer plus the dielectric protection layer on top of the pixel electrode. The capacitance is greater where the dermis is closer to the pixel electrode, and so the surface contours of the skin can be sensed by measuring the capacitance of each pixel (e.g. based on the charge accumulated on the pixel electrode) and assembling an image from those pixels.

Both passive matrix and active matrix capacitive touch sensors have been proposed. Most so-called passive capacitive touch sensing systems use an external driving circuit (such as an integrated circuit, IC) to drive a matrix of passive electrodes, and a separate readout circuit (e.g. an IC) to readout charge stored on these electrodes during the drive cycle. The stored charge varies dependent on the tiny capacitance changes due to touch events. Passive electrode systems are sensitive to environmental noise and interference and resolution is limited compared to, for example, active matrix sensors having active elements.

Active matrix capacitive touch sensors include a switching element in each pixel. The switching element may control a conduction path between the capacitive sensing electrode in the pixel, and an input channel to an ADC in a read-out circuit. Typically each column of pixels in an active array is connected to one such input channel. The charge stored in the array can thus be read from the active matrix by controlling the switching elements to connect each row of pixels, for example one-by-one (although multiplexing can also be used in larger area devices), to the ADC.

SUMMARY

Aspects and examples of the invention are set out in the claims and aim to improve the accuracy of sensing performed by spatial arrays of sensing elements, such as the array of pixels in a fingerprint sensor, and to address other problems.

Embodiments of the disclosure relate to sensing elements and the read-out circuits for taking signals from such sensing elements. The sensing elements may be pixels arranged in a spatial array for sensing a parameter at a set of predefined spatial locations. In such systems, and other systems, embodiments of the present disclosure aim to provide measurements of the parameter which are directly comparable between each sensing element. In other words, embodiments aim to sense the parameter at each sensing element in such a way that variations in the characteristics of the sensing elements themselves and/or their components do not contribute to the level of the parameter.

Fingerprint sensors are one particular example of such a system, and are one in which the above issue of inter-sensor variability can be a significant source of inaccuracy. However, embodiments of the present disclosure may find application in a wide variety of circumstances, not just those in which the sensing elements are arranged as pixels in a rectilinear grid. The specific examples, described below with reference to the drawings, are explained with reference to pixels, such as those which are used in fingerprint sensors. The principles, methods, and circuits, which are described however may be used in any of a variety of sensing elements, and in particular those which operate to sense accumulated charge, such as by capacitive methods, e.g. self-capacitance sensors.

In an aspect there is provided a method of operating a sensing element, such as a pixel of a fingerprint sensor to sense a parameter such as the proximity of a surface to a sensing electrode—for example based on the capacitance of the sensing electrode. The sensing element comprises a sense TFT having a gate connection connected to a sensing electrode, and the method comprises:

providing a reference current ($I_{bias}$) through the sense TFT;

providing a reference voltage ($V_{bias}$) at the gate connection to obtain a reference sample voltage ($V_{cap}$) from a source connection of the sense TFT;

providing, at the gate connection, an indicator voltage ($V_{gate}$) dependent upon the parameter to be sensed whilst the reference current ($I_{bias}$) continues to be provided through the sense TFT to obtain a sensing voltage from the source connection of the sense TFT; and sensing the parameter based on the difference between the sensing voltage ($V_S$) and the reference sample voltage ($V_{cap}$).

The sensing of the parameter may be done using a constant current approach in which the current ($I_{bias}$) through the sense TFT while the sensing voltage is obtained is equal to the reference current ($I_{bias}$). In other words—the total current through the sense TFT may be the same when both the reference sample voltage and the sensing voltage are obtained. However, this is optional and in another embodiment the current through the sense TFT while the sensing voltage is obtained comprises the reference current ($I_{bias}$) and a difference current ($I_{int}$). Sensing the parameter may comprise integrating this difference current ($I_{int}$). The difference current may correspond to the current drawn by an integrating amplifier based on the difference between the sensing voltage ($V_S$) and the reference sample voltage ($V_{cap}$).

Obtaining the reference sample voltage may comprise charging a capacitor from the source of the sense TFT and then holding said charge on the capacitor.

Providing the reference current may comprise operating a select TFT of the sensing element to connect a drain of the sense TFT to a supply voltage while operating a current source connected to the source of the sense TFT to set the reference current.

Providing the indicator voltage may comprise applying a drive voltage to first plate of a reference capacitor, wherein a second plate of the reference capacitor is connected to the sensing electrode and to the gate connection of the sense TFT.

An aspect provides a method of operating a sensor, the sensor comprising a plurality of sensing elements, each sensing element comprising a corresponding sense TFT connected to be controlled by an indicator voltage, such as the voltage on a sensing electrode of said each sensing element. This method comprises:

sensing an indication of charge stored on the sensing electrode of each sensing element based on a difference between the source voltage of the corresponding sense TFT in response to:

(a) a reference voltage ($V_{bias}$) applied to a gate connection of the sense TFT while a reference current ($I_{bias}$) is provided through the sense TFT; and (b) the indicator voltage being applied to the gate connection while the reference current ($I_{bias}$) is provided through the sense TFT.

The sensing elements may each comprise a pixel of a fingerprint sensor configured to sense a parameter such as the proximity of a surface to the sensing electrode of the pixel—for example based on the capacitance of the sensing electrode.

The current through the sense TFT (e.g. the total current) while the indicator voltage is applied may be equal to the reference current ($I_{bias}$). However, in other embodiments the current through the sense TFT while the indicator voltage is applied may comprise the reference current ($I_{bias}$) and a difference current ($I_{int}$) in addition to the reference current.

Sensing the indication of charge may comprise sensing the difference current. This may be done by integrating the reference current. For example, an integrating amplifier may draw the difference current through the sense TFT in response to the difference between the source voltages of the sense TFT, (a) and (b) above.

The integration may be done for a sampling period of the integrating amplifier, and the method may further comprise using the same reset signal to reset both the integrating amplifier and a capacitor storing a sample of the source voltage associated with the reference voltage ($V_{bias}$) applied to a gate connection of the sense TFT while a reference current ($I_{bias}$) is provided through the sense TFT.

The method may comprise activating the each sensing element by applying a select voltage to a select TFT of the sensing element to connect the sense TFT to a voltage supply while the reference voltage is applied to the gate connection of the sense TFT.

The method may comprise switching the each sensing element from a reference state to a sensing state by disconnecting the reference voltage from the gate connection and applying a drive signal to a capacitive potential divider comprising the sensing electrode.

An aspect of the disclosure provides an apparatus comprising:

a sensor comprising a plurality of sensing elements for sensing a parameter, each sensing element comprising a sensing electrode and a sense TFT connected to be controlled by a voltage on the sensing electrode;

a read out circuit comprising:

a reference current provider connected to a source of the sense TFT and configured to provide a reference current ($I_{bias}$) through the sense TFT, a voltage sampler connectable to the source of the sense TFT for obtaining a reference sample voltage from the source of the sense TFT, and storing said reference sample voltage;

a signal determiner, connected to the voltage sampler and to the source of the sense TFT for sensing the parameter based on a difference between:

(a) the reference sample voltage and (b) the source voltage of the sense TFT in response to an indicator voltage of the sensing electrode while the reference current ($I_{bias}$) is provided through the sense TFT.

The sensing element may comprise a pixel of a fingerprint sensor configured to sense a parameter such as the proximity of a surface to the sensing electrode of the pixel—for example based on the capacitance of the sensing electrode.

The signal determiner may be configured so that the current through the sense TFT (e.g. the total current through the sense TFT) while the indicator voltage is applied to a gate of the sense TFT is equal to the reference current ($I_{bias}$).

For example, the signal determiner may be configured to draw zero current. For example, it may comprise an impedance matching element such as a buffer amplifier, having an input connected to the source of the sense TFT.

In other embodiments the signal determiner is configured so that the current through the sense TFT while the indicator voltage is applied comprises the reference current ($I_{bias}$) and a difference current ($I_{int}$), in addition to the bias current.

The signal determiner may comprise an integrator, such as an integrating amplifier circuit configured to integrate the difference current ($I_{int}$).

For example, the integrating amplifier may draw the difference current ($I_{int}$) from the sense TFT based on the difference between the reference sample voltage and the source voltage of the sense TFT in response to the indicator voltage.

The voltage sampler may comprise a sampling capacitor switchably connected to the source of the sense TFT for obtaining the reference sample voltage. The switchable connection may be provided by a sampling TFT, connected between a plate of the sampling capacitor and the source of the sense TFT.

Each sensing element may comprise a select TFT arranged to switchably connect a drain of the sense TFT to a supply voltage, $V_{sup}$.

The apparatus may be configured to synchronise connecting the voltage sampler (e.g. the sampling capacitor) to the source of the sense TFT with connecting the drain of the sense TFT to the supply voltage. For example they may be done simultaneously, or a selected delay may be provided between (a) connecting the voltage sampler (e.g. the sampling capacitor) to the source of the sense TFT and (b) connecting the drain of the sense TFT to the supply voltage.

The apparatus may be arranged to disconnect the voltage sampler from the source of the sense TFT before disconnecting the drain of the sense TFT from the supply voltage.

The apparatus may be configured so that a drive signal for the sensing element is switched on while the drain of the sense TFT is connected to the supply voltage and the voltage sampler is disconnected from the source of the sense TFT. The drive signal may comprise a gate drive voltage applied to a row of pixels of an array, each pixel comprising one of the plurality of sensing elements.

A first switch, such as a reset TFT of the integrating amplifier, may be configured to be operated to discharge a feedback capacitor of the integrator concurrently with operating a second switch, such as the sampling TFT, to connect the voltage sampler to the source of the sense TFT. For example, the first switch and the second switch may be connected to be operated by the same control signal.

The apparatus may be arranged to operate a third switch, such as a reset TFT of the sensing element, to connect the gate connection of the sense TFT to a reference voltage ($V_{bias}$) concurrently with connecting the voltage sampler to the source of the sense TFT.

The apparatus may be arranged so that the drive signal for each sensing element is connected to operate the first switch, and the second switch, and the third switch of a second sensing element of the apparatus. For example, the gate drive signal for one pixel (or one row of pixels) may be used to control the reset TFT of another pixel.

Some particular embodiments are described below with reference to the drawings. These embodiments are presented with particular combinations of features. For the avoidance of doubt, the disclosure of this application is intended to be considered as a whole. Any feature of any one of the examples disclosed herein may be combined with any features of any of the other examples disclosed herein. The mere description of two features in collocation should not be taken to imply that either is essential to the other, nor inextricably linked to it.

Features of methods may be implemented in suitably configured hardware, and the functionality of the specific hardware described herein may be employed in methods which may implement that same functionality using other hardware.

BRIEF DESCRIPTION OF DRAWINGS

Some practical implementations will now be described, by way of example only, with reference to the accompanying drawings in which:

FIG. 1 shows an apparatus comprising pixel for a sensing array and a read-out circuit for obtaining a signal from the pixel;

FIG. 2 shows a timing diagram illustrating an example of operating a circuit such as that shown in FIG. 1;

FIG. 3 shows an apparatus comprising pixel for a sensing array and a read-out circuit for obtaining a signal from the pixel; and, FIG. 4 shows an apparatus comprising an array of pixels such as those illustrated in FIG. 1 and read-out circuits such as those described with reference to FIG. 1 or FIG. 3.

In the drawings like reference numerals are used to indicate like elements.

Specific Description

FIG. 1 shows an apparatus comprising a pixel 12 of a sensing array and a first read-out circuit 200 for obtaining a sensing signal from the pixel 12.

The pixel 12 comprises three thin film transistors, TFTs, a select TFT 20, a sense TFT 22, and a reset TFT 24. It also includes a reference capacitor 18, and a capacitive sensing electrode 14. It has three control input connections for receiving control signals, these include a "select" input, a gate drive input, and a reset input for connection to corresponding control signals—a gate drive signal 510-1, a select signal 510-2, and a reset signal 510-3. The pixel also includes two voltage connections, one for connecting the pixel to a supply voltage, $V_{sup}$, and one for connecting the pixel to a reference voltage $V_{bias}$. The pixel 12 also has an output connection 30 for providing an output from the pixel 12, this can be connected to an output line 32 for the column of pixels in the array.

The drain of the select TFT 20 is connected to the supply connection $V_{sup}$ and the source of the select TFT 20 is connected to the drain of the sense TFT 22. The gate of the select TFT 20 is connected to the select input for receiving the select signal 510-2.

The drain of the sense TFT 22 is connected to the source of the select TFT 20 and the source of the sense TFT 22 is connected to the output line 32 for the column of pixels in the array in which the pixel is situated—e.g. to provide an output 30 from the pixel. The gate of the sense TFT 22 is connected to the capacitive sensing electrode 14 and to the drain of the reset TFT 24 and to a one plate of the reference capacitor 18. The other plate of the reference capacitor 18 is connected to the gate drive input of the pixel for receiving a gate drive signal 510-1.

The gate of the reset TFT 24 is connected to the reset input, which may be provided by the gate drive signal of another row of pixels. The source of the reset TFT 24 is connected to the reference voltage $V_{bias}$.

The read-out circuit 200 comprises an input for connection to the output line 32 for the column, which may be provided via a multiplexer MUX, to allow the read-out circuit 200 to obtain sensing signals from any selected one of a plurality of columns of the array. It also comprises a current source 202, an integrator 204 comprising an amplifier 206, an integration capacitor 210, and an integration reset TFT 208. The read-out circuit 200 also comprises a sample capacitor 212 and a sampling TFT 214. It may also comprise an integration resistor Rint, and optionally also a sample and hold circuit 216 and an ADC 218.

The current source 202 is connected between the input of the read-out circuit 200 and a reference voltage such as a ground. The input of the read-out circuit 200 is connected to the drain connection of the sampling TFT 214. The source connection of the sampling TFT 214 is connected to the non-inverting input of the amplifier 206 and to one plate of the sample capacitor 212. The other plate of the sample capacitor 212 is connected to a reference voltage such as ground. The input of the read-out circuit is also connected to the inverting input of the amplifier 206 by the resistance Rint.

The sense TFT 22 is operated as a source-follower in the manner explained below and is configured to sense the voltage stored at the mid-point of the capacitive potential divider formed by the sensing electrode 14 and the reference capacitor 18. It will be appreciated in the context of the present disclosure that this means that the voltage at the mid-point in response to a known voltage across that capacitive potential divider 14, 18 provides an indication of the capacitance of the sensing electrode 14—and hence the proximity to the sensing electrode 14 of an object to be sensed.

The select TFT 20 is operated as a switch—this enables the pixel 12 to be "switched on", by connecting the sense TFT 22 to the supply voltage $V_{sup}$, and "switched off" by disconnecting the sense TFT 22 from the supply voltage. Thus, the pixels 12 in each column of the array can be selectively "switched on" while all other pixels in that column are "switched off" (isolated from the supply voltage, $V_{sup}$) so that they can pass no current to the column output line 30.

In the arrangement illustrated in FIG. 1, the function of the current source 202 in the read-out circuit 200 is to set a bias current, $I_{bias}$ in the selected column 32 of the sensing array. This current is drawn only from the pixel (or pixels) in the column which are "switched on". It serves to provide a baseline current, against which disturbances in the current passed through the sense TFT can be assessed.

Operation of this circuit will now be described with reference to FIG. 2.

As illustrated in FIG. 2, at the start of a cycle of operation of the pixel 12, the 'select' input 510-2 of the pixel 12 is switched high, which causes the select TFT 20 to switch on so as to connect the supply voltage $V_{sup}$ to the drain of the sense TFT 22. This "switches on" the pixel as explained above. While the select input 510-2 of that pixel is high, the select 510-2 in all other pixels may be held low—i.e. they may all be switched off. As a result, the current source 202 in the read-out circuit 200 sets the current $I_{bias}$ through the sense TFT 22 of that pixel 12 alone. The gate-source voltage $V_{gs}$ of the sense TFT 22 is therefore also set by this bias current, $I_{bias}$, according to the current-voltage characteristic of the sense TFT 22.

Concurrently with the 'select' input being set high, the 'reset' input 510-3 of the pixel is also switched high. This connects the reference voltage $V_{bias}$ to the gate terminal of the sense TFT 22 and to a plate of the reference capacitor 18. This charges that point in the circuit, $V_g$, to the bias voltage $V_{bias}$. Accordingly, the source voltage of the sense TFT 22 is also shifted because the gate-source voltage remains constant—the voltage of the source follows the voltage of the gate. Said in other words, the sense TFT 22 operates as a "source follower".

With the pixel in this state, the gate of the sample TFT 214 of the read-out circuit is then switched high, which causes the sample capacitor 212 to charge to a voltage $V_{cap}$. This voltage $V_{cap}$ reflects the source voltage of the sense TFT 22 of the pixel 12 when its gate is at $V_{bias}$ and the current through it, $I_{bias}$, is that which is set by the current source 202.

At this stage, the gate of the integration reset TFT 208 is also switched high to discharge any charge stored on the integration capacitor 210. This may be synchronized with switching on the sample TFT of the read-out circuit, for example it may be done simultaneously and/or by the same signal or triggered by that signal.

The integration reset TFT 208 and the sample TFT 214 of the read-out circuit 200 are then switched off. This isolates the sample capacitor 212 at the non-inverting input, which holds that input at a voltage which reflects the source voltage of the sense TFT 22 when the current through the sense TFT 22 is $I_{bias}$ and the voltage on the capacitive sensing electrode 14 is $V_{bias}$. This may provide a baseline which characterizes the sense TFT 22.

The reset TFT 24 is then also switched off, which disconnects $V_g$ from the bias voltage, $V_{bias}$.

The drive input of the pixel 12 is then operated to apply a known voltage, the drive signal, to the series connection of the sensing electrode 14 and the reference capacitor 18. The capacitive sensing electrode 14 is thus charged to a level, e.g. a proportion of the drive voltage, which indicates the capacitance of the sensing electrode 14 relative to that of the reference capacitor 18. The charge on the sensing electrode 14 provides the voltage $V_g$ at the gate of the sense TFT 22. The voltage at the source of the sense TFT 22 follows (changes by the same amount as) the voltage, $V_g$ at its gate.

Because the sample TFT 214 of the read-out circuit is off, the source voltage of the sense TFT 22 is applied to the inverting input of the amplifier 206. The amplifier 206 operates to charge the integration capacitor according to the difference between this voltage and the voltage stored on the sampling capacitor. This draws an additional current $I_{int}$ through the sense TFT 22. During this stage of operation, as the integration capacitor is charging up, the current through the sense TFT 22 is equal to the sum of the bias current, $I_{bias}$ and this additional "difference current" $I_{int}$ due to the disturbance in the voltage on the gate of the sense TFT 22. The current $I_{bias}$ continues to flow through the current source, while the additional current $I_{int}$ is integrated by the amplifier 206 (charges the integration capacitor) until the select TFT 20 of the pixel and/or the drive signal 510-1, 510-2 are switched low.

After a selected time following the rising edge of the drive signal 510-2 the sample and hold circuit 216 is operated to obtain a sample of the voltage at the output of the amplifier 206. This voltage is based on the sum of the voltage across the integration capacitor 210 (the time integral of the current $I_{int}$ drawn from the pixel) and the voltage on the column output line 32.

This provides a sensing output signal from the pixel in which effects due to the characteristics of the sense TFT 22 have been offset by the use of the sample obtained during the 'reset' phase of operation of the pixel 12. This may provide particular advantages in systems in which the measurements provided by one pixel are to be compared with those from another. A fingerprint sensor is one example of such a system, and apparatus according to the present disclosure provides particular advantages in such sensors. It will however be appreciated that the principals of the present disclosure may find application in any sensor and in self capacitance sensors in particular.

There are other read out circuits and methods of operating the same pixel to address the problem of variability between pixels.

FIG. 3 shows one such alternative, and illustrates apparatus comprising a pixel 12 of a sensing array and a different read-out circuit for obtaining a sensing signal from the pixel. The pixel of the apparatus shown in FIG. 3 is identical to that which is described above with reference to FIG. 1 and FIG. 2.

The read-out circuit shown in FIG. 3 comprises an input for connection to the output line 32 for the column, which may be provided via a multiplexer MUX, to allow the read-out circuit 400 to obtain sensing signals from any selected one of a plurality of columns of the array. It also comprises a current source 202, a differential amplifier 220, a sample capacitor 212, and a sampling TFT 214. It may also comprise a sample and hold circuit 216 and an ADC 218.

The current source 202 is connected between the input of the read-out circuit 400 and a reference voltage such as ground. The input of the read-out circuit 400 is connected to the drain connection of the sampling TFT 214. The source connection of the sampling TFT 214 is connected to the non-inverting input of the amplifier 220 and to one plate of the sample capacitor 212. The other plate of the sample capacitor 212 is connected to a reference voltage such as ground. The input of the read-out circuit is also connected to the inverting input of the differential amplifier 220.

Operation of this circuit will now be described.

At the start of a cycle of operation of the pixel 12, the 'select' input 510-2 of the pixel is switched high, which causes the select TFT 20 to switch on and to connect the supply voltage $V_{sup}$ to the drain of the sense TFT 22. This "switches on" the pixel as explained above. While the select input 510-2 of that pixel is high, the select in all other pixels may be held low—i.e. they may all be switched off. As a result, the current source sets the current $I_{bias}$ through the sense TFT of that pixel alone. The gate-source voltage $V_{gs}$ of the sense TFT is therefore also set by this bias current, $I_{bias}$, according to the current-voltage characteristic of the sense TFT 22.

Concurrently with the 'select' input being set high, the 'reset' input 510-3 of the pixel is also switched high. This connects the reference voltage $V_{bias}$ to the gate terminal of the sense TFT 22 and to a plate of the reference capacitor 18. This charges that point in the circuit, $V_g$, to the bias voltage $V_{bias}$. Accordingly, the source voltage of the sense TFT 22 is also shifted because the gate-source voltage remains constant—the voltage of the source follows the voltage of the gate.

The gate of the sample TFT 212 of the read-out circuit 400 is then switched high, which causes the sample capacitor to charge to a voltage $V_{cap}$. This voltage $V_{cap}$ reflects the source voltage of the sense TFT of the pixel when its gate is at $V_{bias}$ and the current through it is that which is set by the current source, $I_{bias}$.

The sample TFT 214 of the read-out circuit is then switched off. This isolates the sample capacitor 212 at the non-inverting input, which holds that input at a voltage $V_{cap}$ which reflects the source voltage of the sense TFT 22 when the current through the sense TFT 22 is $I_{bias}$ and the voltage on the capacitive sensing electrode is $V_{bias}$.

The reset TFT is then also switched off, which disconnects the gate of the sense TFT 22 from the bias voltage.

The drive signal 510-2 applied to the series connection of the reference capacitor and the capacitive sensing electrode is then set high. The capacitive sensing electrode 14 is thus charged to a level which indicates the capacitance of the sensing electrode relative to that of the reference capacitor—e.g. the proportion of the voltage of the drive signal corresponding to the capacitance of the sensing electrode relative to that of the reference capacitor. This charge on the sensing electrode provides the voltage $V_g$ at the gate of the sense TFT. This disturbance of the voltage on the gate of the sense TFT causes a corresponding adjustment in the voltage at the source of the sense TFT. The current source however holds the current through the sense TFT, $I_{bias}$, constant and the differential amplifier draws no current. The voltage at the source of the sense TFT therefore follows the voltage on the gate so that the gate-source voltage, $V_{gs}$, can remain constant in accordance with this constant current, $I_{bias}$.

Thus in contrast to the embodiment described above with reference to FIG. 1 and FIG. 2, the apparatus described with reference to FIG. 3 operates in a constant current voltage-sensing mode.

FIG. 4 shows a sensor apparatus 501 in which a sensor array 505 may be incorporated. Inset A of FIG. 5 shows a detailed view of one pixel of this array, which comprises a pixel 12 such as that described above with reference to FIG. 1, FIG. 2, and FIG. 3.

In the array 505 the pixels 12 are arranged in rows and columns. The apparatus includes a gate drive circuit 510, and a read-out circuit 526.

The gate drive circuit 510 comprises a plurality of gate drive lines 510-1, one for each row of the array, and a plurality of 'select' lines 510-2 also one for each row of the array. The read-out circuit 526 comprises a plurality of input lines 526-1, each corresponding to a column of the array 505. The columns (MUX; FIG. 1 & FIG. 3) of the array may be connected to the readout circuit by a multiplexer (MUX; FIG. 1 & FIG. 3) to reduce the number of input channels required.

Typically, other than in respect of its position in the array 505, each pixel 12 in the array is identical to the others in the array 505. There may however nevertheless be some inherent variability in the characteristics of the TFTs which make up the pixels of this array.

The output of each pixel 12 is provided by the source of the sense TFT 22 for that pixel 12. This is connected to the output line 526-1 for the column. Each pixel in a row is connected to a 'select' line for that row 510-2, and to a 'gate drive' line for that row 510-1. Each pixel is also connected to a 'reset' line for that row 510-3, which may be provided by a connection to a 'gate drive' line of another row, such as the adjacent row.

The apparatus 501 may also include a connector 525 for connection to a controller, such as a controller included in a host device into which the sensing apparatus is to be incorporated. This may be provided by a multi-channel connector having a plurality of conductive lines. This may be flexible, and may comprise a connector such as a flexi, or flexi-rigid PCB, a ribbon cable or similar. The connector 525 may carry a host interface 527, such as a plug or socket, for connecting the conductive lines in the connector to signal channels of the host device. The host interface 527 is connected by the connector 525 to the read-out circuit 526. A controller may be connected to the gate drive circuit 510 for operating the sensor array, and to the read-out circuit 526 for obtaining signals indicative of the self-capacitance of pixels of the sensor array 510. Such a controller may also be integrated in the apparatus 501, for example in place of the connector and/or interface 525, 527.

Operation of the apparatus 501 of FIG. 4 will now be described.

First, the gate drive circuit 524 operates one or more of the select lines 510-2 to switch on the sense TFT 20 of every pixel in the corresponding row (or rows) of the array 505. It also operates the corresponding reset lines 510-3, to switch on the reset TFTs of the pixels in those row(s). This causes the sense TFTs also to switch on and, while the reset signal is being applied, the read-out circuit captures the output voltage from each column on the sampling capacitor (212; FIG. 1 & FIG. 3) of the corresponding input line 526-1 of the read-out circuit.

The gate drive circuit then operates the reset line 510-3 to switch off the reset TFTs before the gate drive circuit operates the gate drive line 510-2 to the series connection of the reference capacitor 18 and the capacitive sensing electrode 14. The voltage at the connection 518 between the two provides an indicator voltage indicating the proximity of a conductive surface of an object to be sensed to the capacitive sensing electrode 14. This indicator voltage may be applied to the gate of the sense TFT 22.

In embodiments in which current sensing is employed the operation of the read-out circuit proceeds as set out above with reference to FIG. 1 and FIG. 2—namely the difference current, $(I_{int})$ from the pixels is integrated. Alternatively, operation of the read-out circuit may be performed as set out above with reference to FIG. 3, namely in a constant current mode in which the total current through the sense TFT is held constant.

The signal at each input channel, such as a voltage obtained by integrating the current from the corresponding column of the array, may be digitised (e.g. using the ADC 218). Thus, for each pulse of the gate drive signal, the read-out circuit 526 obtains a set of digital signals, each signal corresponding to a column of the active row during that gate pulse. So the set of signals together represent the active row as a whole, and the output from each pixel being indicative of the charge stored on and/or the self-capacitance of the capacitive sensing electrode 14 in that pixel.

Following this same process, each of the gate-drive channels is activated in sequence. This drives the sense TFT 22 of each pixel connected to that channel into a conducting state for a selected time (typically the duration of one gate pulse). By activating the rows of the array in sequence the read-out circuit, can scan the sensor array row-wise. Other pixel designs, other scan sequences, and other types of sensor array, may be used.

The array of pixels may be provided on a dielectric shield 508. This generally is in the form of a sheet of an insulating material which may be transparent such as a polymer or glass. The dielectric shield 508 may be flexible, and may be flat or curved. An 'active area' of this shield overlies the sensor array 505. In some examples, the TFTs and other pixel components are carried on a separate substrate, and the shield 508 is provided over these components on their substrate. In other embodiments the shield 508 provides the substrate for these components. For example, they may be deposited on the shield. The dielectric shield 508 may comprise a sheet or layer of electrically a material such as glass or plastic. The material of the dielectric shield described herein may be selected based on one or more of the following properties: surface roughness, transparency, chemical inertia, mechanical stiffness and robustness, dielectric constant; thermal behaviour and ease of manufacture. Suitable glass substrates include but are not limited to: Soda lime, borasilicate and SiO2. Suitable polymer substrates include but are not limited to Poly Imide (PI), Polyethylene terephthalate (PET), polyethylene naphthalate (PEN).

Pixels may be positioned sufficiently closely together so as to be able to resolve contours of the skin such as those associated with epidermal ridges, for example those present in a fingerprint, palmprint or other identifying surface of the body. It will be appreciated in the context of the present disclosure that contours of the skin may comprise ridges, and valleys between those ridges. During touch sensing, the ridges may be relatively closer to a sensing electrode than the "valleys" between those ridges. Accordingly, the capacitance of a sensing electrode adjacent a ridge will be higher than that of a sensing electrode which is adjacent a valley. FIG. 4 includes a grid as a very schematic illustration of the rows and columns of pixels 512 which make up the array. Typically this will be a rectilinear grid, and typically the rows and columns will be evenly spaced. For example the pixels may be square. It will of course be appreciated that the grid shown in FIG. 4 is not to scale. Typically, for fingerprint sensing, the sensor array has a pixel spacing of at least 200 dots per inch, dpi (78 dots per cm). The pixel spacing may be at least 300 dpi (118 dots per cm), for example at least 500 dpi (196 dots per cm).

The embodiments described herein are described as being implemented using TFTs. It will be appreciated in the context of the present disclosure that when implemented into the sensor as a means of achieving voltage controlled impedances thin film transistors would act as transconduction gates wherein the drain-source or output current (Idrain-source) of the TFT would be dependent on the voltage across the gate and source ($V_{gate}$-source) of the TFT. In some embodiments other types of voltage controlled impedance, VCI, may be used. Each such VCI has a control terminal, and a conduction path the impedance of which can be controlled by a voltage applied to its control terminal.

The current source described herein may be provided by any appropriate circuit operable to deliver or to absorb an electric current which is stable in the event of variations in the voltage across the current source, for example the electric current may remain substantially constant independent of voltage changes. Such a current source may be implemented by passive current sources, or active current sources (e.g. comprising one or more active components, such as transistors) Examples include current stable non-linear current sources, boot strapped current sources and so forth.

It will be appreciated from the discussion above that the embodiments shown in the Figures are merely exemplary, and include features which may be generalised, removed or replaced as described herein and as set out in the claims.

With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

In some examples the sensing apparatus described herein may be operated by a controller, configured to operate the apparatus according to any one of the methods described herein. In particular the controller may be configured to operate the gate drive circuit and the read out circuit in the manner described above. Such a controller may be provided by mixed analogue and digital processing and/or control functionality. It may comprise a general purpose processor, which may be configured to perform a method according to any one of those described herein. In some examples the controller may comprise digital logic, such as field programmable gate arrays, FPGA, application specific integrated circuits, ASIC, a digital signal processor, DSP, or by any other appropriate hardware. In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein. The controller may comprise an analogue control circuit which provides at least a part of this control functionality. An embodiment provides an analogue control circuit configured to perform any one or more of the methods described herein.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. These claims are to be interpreted with due regard for equivalents.

The invention claimed is:

1. A method comprising:
providing a reference current ($I_{bias}$) through a sense TFT of a sensing element to operate the sensing element, the sensing element comprising the sense TFT having a gate connection connected to a sensing electrode;
providing a reference voltage ($V_{bias}$) at the gate connection to obtain a reference sample voltage ($V_{cap}$) from a source connection of the sense TFT;
providing, at the gate connection, an indicator voltage (Vgate) dependent upon a parameter to be sensed whilst the reference current ($I_{bias}$) continues to be provided through the sense TFT to obtain a sensing voltage from the source connection of the sense TFT; and
sensing the parameter based on the difference between the sensing voltage (Vs) and the reference sample voltage ($V_{cap}$),
wherein the parameter comprises capacitance of the sensing electrode or accumulated charge on the sensing electrode.

2. The method of claim 1 wherein the current ($I_{bias}$) through the sense TFT while the sensing voltage is obtained is equal to the reference current ($I_{bias}$).

3. The method of claim 1 wherein the current through the sense TFT while the sensing voltage is obtained comprises the reference current ($I_{bias}$) and a difference current (SI).

4. The method of claim 3 wherein sensing the parameter comprises integrating the difference between the sensing voltage (Vs) and the reference sample voltage ($V_{cap}$).

5. The method of claim 4 wherein said integrating draws the difference current ($\delta I$) through the sense TFT.

6. The method of claim 1 wherein obtaining a reference sample voltage comprises charging a capacitor from the source of the sense TFT and then holding said charge on the capacitor.

7. The method of claim 1 wherein providing the reference current comprises operating a select TFT of the sensing element to connect a drain of the sense TFT to a supply voltage while operating a current source connected to the source of the sense TFT to set the reference current.

8. The method of claim 1 wherein providing the indicator voltage comprises applying a drive voltage to first plate of a reference capacitor, wherein a second plate of the reference capacitor is connected to the sensing electrode and to the gate connection of the sense TFT.

9. A method of operating a sensor, the sensor comprising a plurality of sensing elements, each sensing element comprising a corresponding sense TFT connected to be controlled by a voltage on a sensing electrode of said each sensing element, method comprising:
sensing an indication of charge stored on the sensing electrode of each sensing element based on a difference between the source voltage of the corresponding sense TFT in response to:
(a) a reference voltage applied to a gate connection of the sense TFT while a reference current ($I_{bias}$) is provided through the sense TFT; and
(b) an indicator voltage applied to the gate connection while the reference current ($I_{bias}$) is provided through the sense TFT.

10. The method of claim 9 wherein the current through the sense TFT while the indicator voltage is applied is equal to the reference current ($I_{bias}$).

11. The method of claim 9 wherein the current through the sense TFT while the indicator voltage is applied comprises the reference current ($I_{bias}$) and a difference current (SI).

12. The method of claim 11 wherein sensing the indication of charge comprises integrating the difference between the source voltages.

13. The method of claim 9 comprising activating the each sensing element by applying a select voltage to a select TFT of the sensing element to connect the sense TFT to a voltage supply while the reference voltage is applied to the gate connection of the sense TFT.

14. An apparatus comprising:
a sensor comprising a plurality of sensing elements for sensing a parameter, each sensing element comprising a sensing electrode and a sense TFT connected to be controlled by a voltage on the sensing electrode;
a read out circuit comprising:
a reference current provider connected to a source of the sense TFT and configured to provide a reference current ($I_{bias}$) through the sense TFT,
a voltage sampler connectable to the source of the sense TFT for obtaining a reference sample voltage and storing said reference sample voltage;
a signal determiner, connected to the voltage sampler and to the source of the sense TFT for sensing the parameter based on a difference between:

(a) the reference sample voltage and
(b) the source voltage of the sense TFT in response to an indicator voltage of the sensing electrode while the reference current ($I_{bias}$) is provided through the sense TFT,
wherein the parameter comprises capacitance of the sensing electrode or accumulated charge on the sensing electrode.

15. The apparatus of claim 14 wherein the signal determiner is configured so that the current through the sense TFT while the indicator voltage is applied to a gate of the sense TFT is equal to the reference current ($I_{bias}$).

16. The apparatus of claim 14 wherein the signal determiner is configured so that the current through the sense TFT while the indicator voltage is applied comprises the reference current ($I_{bias}$) and a difference current ($\delta I$).

17. The apparatus of claim 16 wherein the signal determiner is configured to integrate the difference between the reference sample voltage and the source voltage of the sense TFT in response to the indicator voltage.

18. The apparatus of claim 14 wherein the voltage sampler comprises a capacitor switchably connected to the source of the sense TFT for obtaining the reference sample voltage.

19. The apparatus of claim 14 wherein each sensing element comprises a select TFT arranged to switchably connect a drain of the sense TFT to a supply voltage.

20. The apparatus of claim 19 arranged to connect the voltage sampler to the source of the sense TFT concurrently with connecting the drain of the sense TFT to the supply voltage.

\* \* \* \* \*